US011343272B2

(12) United States Patent
Kapinos et al.

(10) Patent No.: US 11,343,272 B2
(45) Date of Patent: May 24, 2022

(54) PROOF OF WORK BASED ON COMPRESSED VIDEO

(71) Applicant: Lenovo (Singapore) Pte. Ltd., Singapore (SG)

(72) Inventors: Robert J. Kapinos, Durham, NC (US); Robert Norton, Raleigh, NC (US); Russell Speight VanBlon, Raleigh, NC (US); Scott W. Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 292 days.

(21) Appl. No.: 16/851,390

(22) Filed: Apr. 17, 2020

(65) Prior Publication Data

US 2021/0329027 A1 Oct. 21, 2021

(51) Int. Cl.
*G06Q 20/06* (2012.01)
*H04L 29/06* (2006.01)
*H04N 21/234* (2011.01)
*G06V 20/40* (2022.01)

(52) U.S. Cl.
CPC ....... *H04L 63/1458* (2013.01); *G06Q 20/065* (2013.01); *G06V 20/40* (2022.01); *H04N 21/234* (2013.01)

(58) Field of Classification Search
None
See application file for complete search history.

(56) References Cited

FOREIGN PATENT DOCUMENTS

| EP | 3651104 A1 * | 5/2020 | ............ G06F 16/211 |
| WO | WO-2019034969 A1 * | 2/2019 | ............ G06F 16/27 |
| WO | WO-2020110115 A1 * | 6/2020 | ......... G06F 16/1824 |

OTHER PUBLICATIONS

"Proof-of-work system," Wikipedia, Jun. 2019, 5 pages.

* cited by examiner

*Primary Examiner* — Cai Y Chen
(74) *Attorney, Agent, or Firm* — VanLeeuwen & VanLeeuwen; Philip L. Weinstein

(57) ABSTRACT

An approach is provided that transmits a compressed video file and a work unit to various clients, receiving, from at least one of the clients. A proof of work submission is received from one of the clients with the proof of work being a result of one or more computations performed by the client on a rendered form of the compressed video file. The approach determines whether the proof of work submission is acceptable. If the proof of work submission is acceptable, then a block is added to a set of blocks included in a blockchain.

20 Claims, 6 Drawing Sheets

PROOF OF WORK BASED ON COMPRESSED VIDEO

BACKGROUND

A proof-of-work (PoW) system is a consensus mechanism. It deters denial-of-service attacks and other service abuses such as spam on a network by requiring some work from the service requester, usually meaning processing time by a computer. A key feature of these schemes is their asymmetry: the work must be moderately hard (yet feasible) on the requester side but easy to check for the service provider. This idea is also known as a CPU cost function, client puzzle, computational puzzle, or CPU pricing function. Cryptocurrency systems often use proof-of-work. Cryptocurrency is typically a decentralized digital currency without a central bank or single administrator. Cryptocurrency can be sent from user to user on a peer-to-peer network without the need for intermediaries. Cryptocurrency transactions are verified by network nodes through cryptography and recorded in a public distributed ledger called a "blockchain." A blockchain is a chain of blocks, with each block containing a hash of the previous block up to the genesis (initial) block of the chain. A network of communicating nodes running common software maintains the blockchain. Transactions of the form payer X sends Y cryptocurrency to payee Z are broadcast to this network using readily available software applications. To be accepted by the rest of the network, a new block must contain a proof-of-work (PoW). Within the cryptocurrency communities there are often groups working together in "mining pools." Some miners use application-specific integrated circuits (ASICs) for PoW. While some PoWs claim to be ASIC-resistant, a challenge remains to prevent a group, with or without use of ASIC technology, from solving multiple successive blocks, in which case such a group could insert fraudulent transactions in the cryptocurrency ledger and thwart the integrity of the cryptocurrency.

SUMMARY

An approach is provided that transmits a compressed video file and a work unit to various clients, receiving, from at least one of the clients. A proof of work submission is received from one of the clients with the proof of work being a result of one or more computations performed by the client on a rendered form of the compressed video file. The approach determines whether the proof of work submission is acceptable. If the proof of work submission is acceptable, then a block is added to a set of blocks included in a blockchain.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
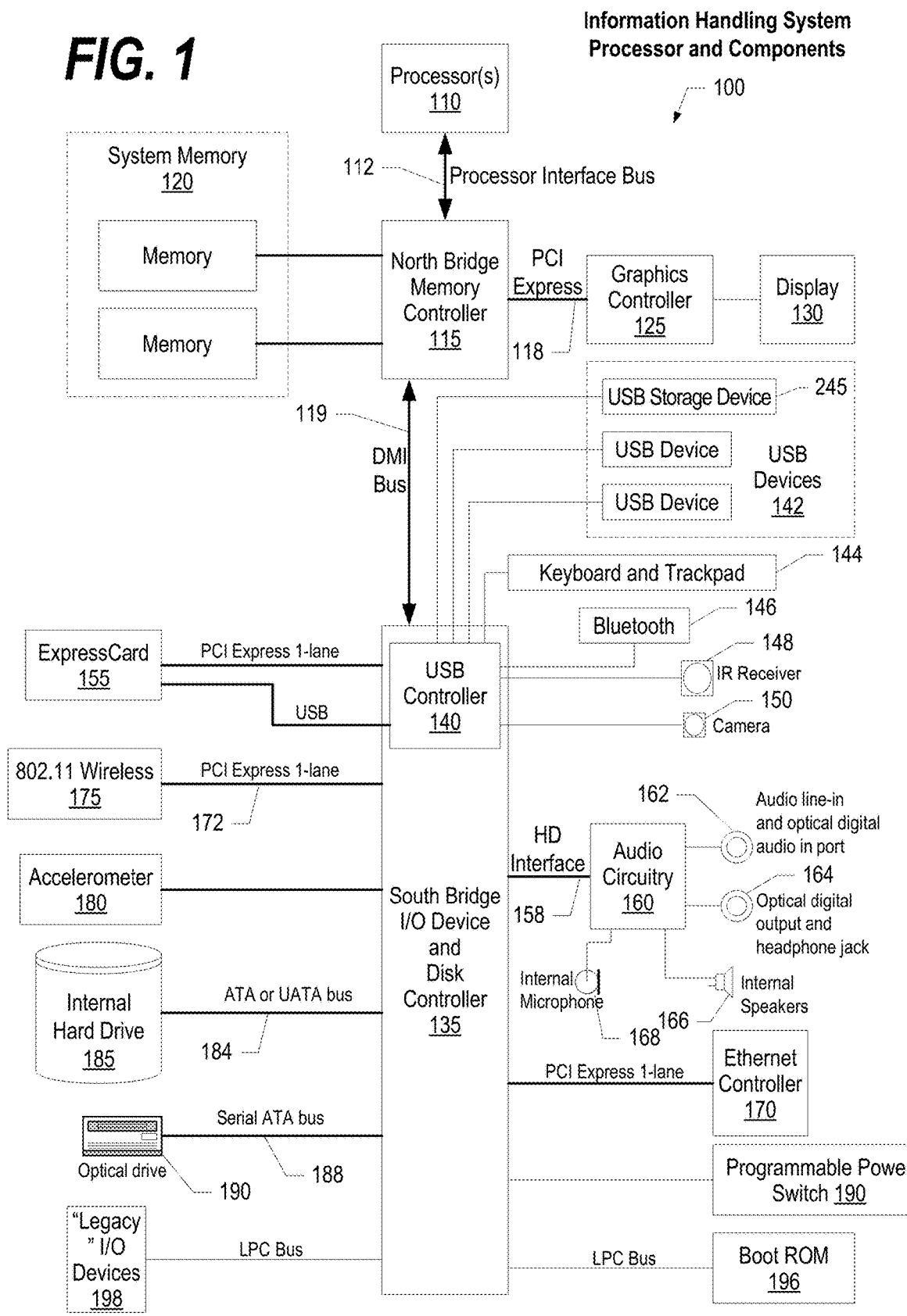
FIG. 1 is a block diagram of a data processing system in which the methods described herein can be implemented.

The figures show an approach that uses the innately lossy nature of video compression to generate extremely scalable work units that can be used as proof of work for block chain implementations. Video files are typically stored using a lossy compression algorithm such as MPEG or HEVC. Reconstruction for playback is done as an approximation to the original using perceptual coding and spline type smoothing. Most every given reconstruction differs from the original by at least bits. The difficulty of reconstruction of video compression is proportional to the bandwidth of the video and the amount of de-normalization required. Higher bandwidth video suffers more bit loss than lower bandwidth video at the same compression ratio. Video that has a high degree of coefficient normalization (e.g., very compressed files, etc.) has a higher degree of loss than video that is less compressed.

In order to use video as proof of work, the approach performs the following general steps that are described more fully in the drawings and corresponding text. A reference sequence of uncompressed frames is hashed to provide an answer. That same sequence is compressed with the desired degree of difficulty. Clients (e.g., "workers," "miners," etc.) reconstruct the video and obtain an answer hash that is compared to the expected hash that was taken from the uncompressed frames.

There are several advantages of using this approach. First, video files are readily available in great quantities from many sources and more can be created relatively easily. The frame based nature of video allows the source hash to be made as large as needed by increasing the number of frames to scale difficulty against newer better hardware utilized by clients. Control of the level of compression allows for varying the amount of entropy needed by the clients to solve any given unit of work. Hardware to perform the basic decompression functionality already exists and is already highly optimized due to the proliferation of compressed videos by users. Additionally, standard scoring frameworks for reconstructive accuracy already exist. Finally, decompression and reconstruction of video is already being performed by many devices (e.g., computer systems, tablets, set top boxes, etc.) for watching videos by consumers.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
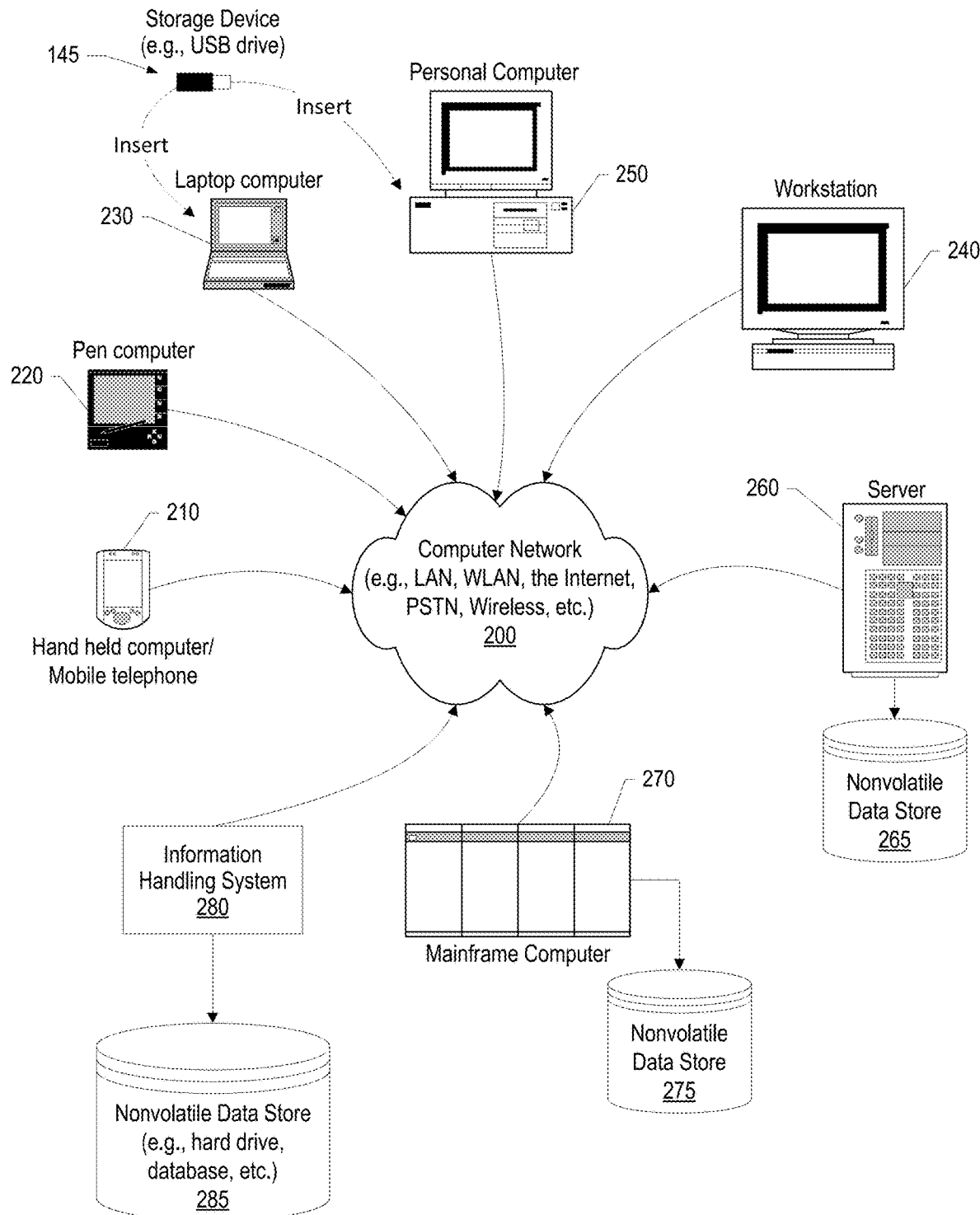
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
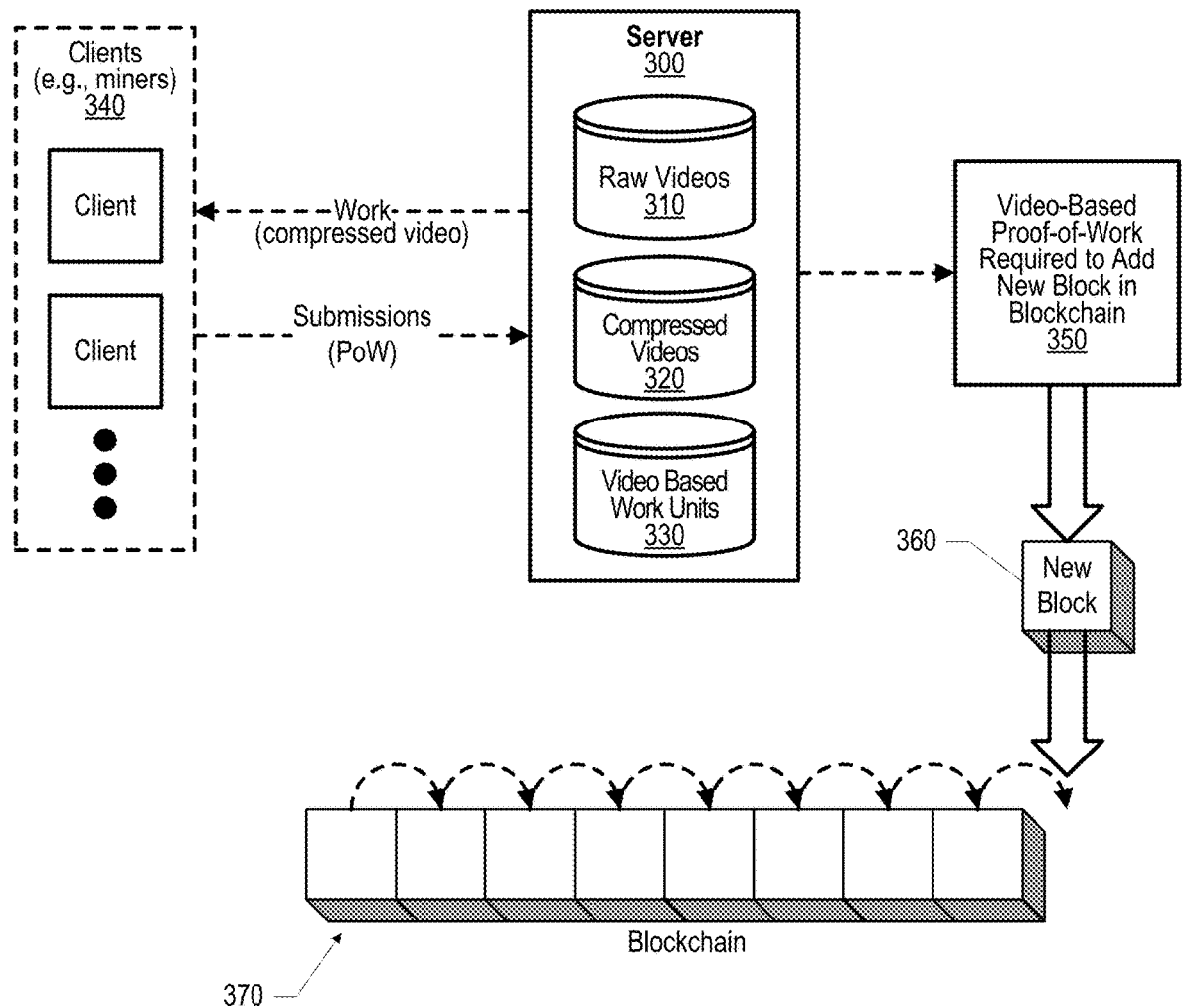
FIG. 3 is a component diagram depicting the components used in a proof of work system using compressed video files.
Figure 4:
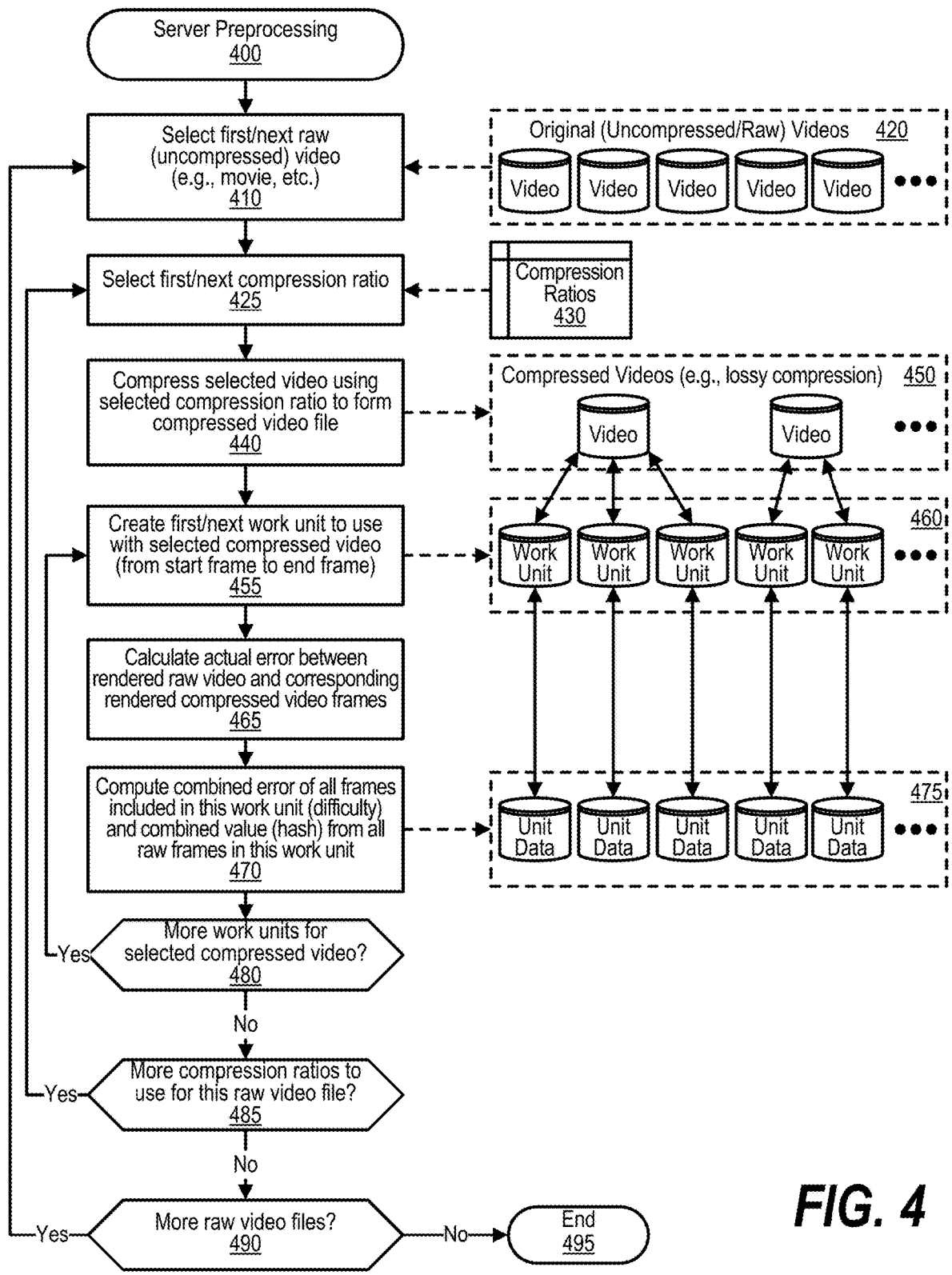
FIG. 4 is a flowchart showing steps taken by a server process that prepares compressed video files and corresponding work units.

FIG. 3 is a component diagram depicting the components used in a proof of work system using compressed video files. Server 300 use raw video files 310 that can be collected and accessed from a variety of online sources. These raw video files are processed as described in detail in FIG. 4. The result of the processing shown in FIG. 4 are compressed videos 320, which are compressed forms of the raw videos, and video based work units 330 which identify work that clients are to perform to provide proof-of-work (PoW) that the client successfully completed the task set forth in a proof of work. A single raw video file can be compressed at multiple compression ratios to generate multiple compressed videos from a single raw video. Additionally, one or more video based work units can be generated for each of the compressed video files. Because clients perform work on each frame identified by the work units, in one embodiment, work units sent to a particular clients do not have overlapping segments of frames so that the client cannot do work to satisfy more than one work unit simultaneously.

Clients 350 (e.g., "miners," "workers," etc.) request work from server 300 and receive one or more work units with each work unit corresponding to a compressed video file. In one embodiment, server 300 also sends the clients the compressed video file, while in another embodiment, the clients retrieve the compressed video file from another repository, such as an online library of videos. The clients perform work on the received compressed video files as detailed in FIG. 5. When work is completed, the client transmits the client's answer to the work back to server 300 where the server compares the client's answer to an expected answer. In one embodiment, the expected answer was generated by the server based on the uncompressed (raw) version of the video file, thus potentially making it more difficult for the client to submit an acceptable answer.

When an acceptable answer is received from one of the clients, at 350, server 300 adds new block 360 to blockchain 370. In one embodiment, multiple work units are needed to be satisfied before a new block is added to the blockchain. In this embodiment, new block 360 is added to blockchain 370 when a client submits an acceptable answer corresponding to a last work unit corresponding to the new block.

FIG. 4 is a flowchart showing steps taken by a server process that prepares compressed video files and corresponding work units. FIG. 4 processing commences at 400 and shows the steps taken by a server process that prepares compressed video files and work units for proof of work by clients. At step 410, the process selects the first raw (uncompressed) video (e.g., movie, etc.) from data store 420, such as a collection of raw video files.

At step 425, the process selects the first compression ratio to use to compress the selected raw video. A single raw video file can be compressed using multiple compression ratios to create multiple compressed videos from a single raw video file. The compression ratios that are being used by the system are retrieved from memory area 430. At step 440, the process compresses the selected video using the selected compression ratio to form a compressed video file that is stored in data store 450. For example, a lossy compression technique or any compression technique can be used where the decompression of the compressed video will not be exactly the same as the original. The greater the compression, the smaller the resulting compressed video file, however greater compression usually results in a greater amount of data loss when the video is later recompressed.

At step 455, the process creates the first work unit to use with the selected compressed video file. The work unit defines a segment from a starting frame to an ending frame with the proof of work being work done on frames within the defined segment (e.g., each frame within the segment, etc.). The created work unit is stored in data store 460. Multiple work units can be created corresponding to different frames within the same video file. In one embodiment, work units provided to the same client do not have overlapping segments so that the client cannot perform work for multiple work units simultaneously.

At step 465, the process calculates the actual error between each frame rendered from the raw video in the defined segment and the corresponding frames rendered from the compressed video file. In one embodiment, a hash is taken corresponding to each of the frames in the defined segment. At step 470, the process computes a combined error of all of the frames included in this work unit and, in one embodiment, a combined value is generated by taking a hash from all of the raw frame calculations performed in step 465 in this work unit. A result of step 470 is an expected "answer" that is compared to answers submitted by clients with the comparison used to determine when an client's answer is sufficient as a proof-of-work. The expected answers corresponding to each work unit are stored in data store 475.

In one embodiment, the server chooses which work units to distribute to clients based on the difficulty desired by the system to add new blocks to the blockchain. If more difficulty is desired, then work units with higher difficulties as computed by step 470 can be distributed to clients. On the other hand, if less difficulty is desired, then work units deemed less difficult by the analysis performed at step 470 are distributed. The computed difficulty level is stored in as work unit metadata 475 corresponding to each of the work units. In addition, because of the frame-based nature of this approach, increased difficulty can be acquired for any of the work units by adding additional frames to the work unit or by introducing additional data loss in the data compression when generating the compressed video files.

The process determines as to whether there more work units to generate for the selected compressed video file (decision 480). If there more work units to generate for the selected compressed video file, then decision 480 branches to the 'yes' branch which loops back to step 455 to create the next work unit and calculate an expected "answer" corresponding to the next work unit as described above. This looping continues until no more work units are being generated for the selected compressed video file, at which point decision 480 branches to the 'no' branch exiting the loop.

The process next determines as to whether there are more compression ratios to use to create additional compressed videos corresponding to the selected raw video file (decision 485). If there are more compression ratios to use, then decision 485 branches to the 'yes' branch which loops back to step 425 to select the next compression ratio and create another compressed video file and work units corresponding to this compressed video file. This looping continues until there are no more compression ratios being used, at which point decision 485 branches to the 'no' branch exiting the loop.

The process next determines whether there are more raw video files to select and process to make compressed video files and corresponding work units as described above (decision 490). If there are more raw video files to select and process, then decision 490 branches to the 'yes' branch which loops back to step 410 to select and process the next raw (uncompressed) video file from data store 420. This looping continues until all needed raw video files have been selected and processed, at which point decision 490 branches to the 'no' branch exiting the loop. The server processing shown in FIG. 4 thereafter ends at 495.

Figure 5:
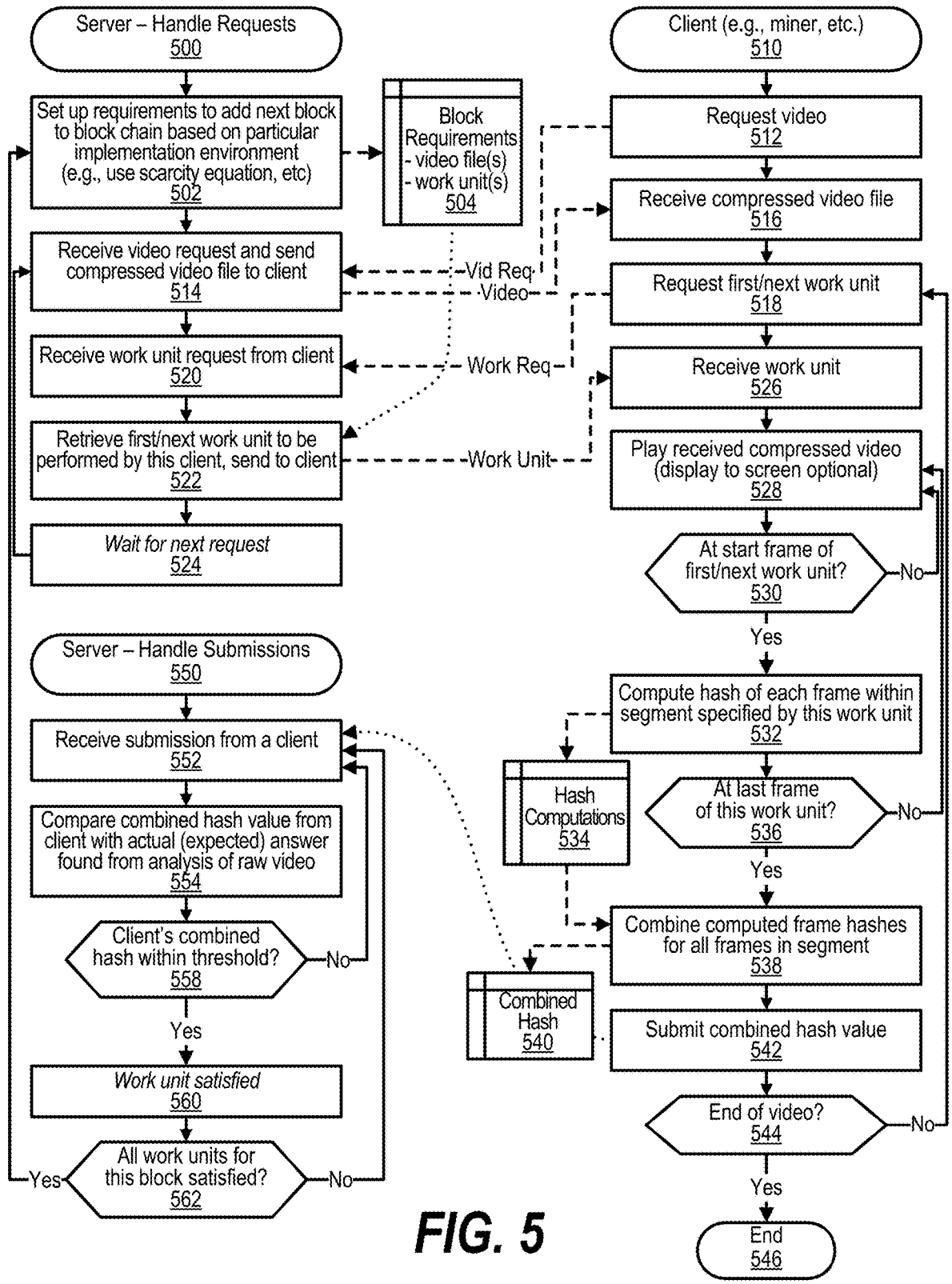
FIG. 5 is a set of client-server flowcharts showing steps taken by client and server video-based proof of work processes.

FIG. 5 is a set of client-server flowcharts showing steps taken by client and server video-based proof of work processes. Processing performed by the server to handle requests commences at 500. At step 502, the server process sets up the requirements needed to be satisfied to add the next block to a blockchain with the actual requirements (e.g., difficulty, etc.) being based on the particular implementation environment (e.g., number of clients expected, use of the scarcity equation, etc). The block requirements are stored in memory area 504. In one embodiment, the block requirements include identifiers of the compressed video file or files corresponding to the proof of work for the block and the work units defining the proof of work to be performed on the corresponding compressed video files.

Processing performed by the client commences at 510 whereupon, at step 512 the client requests work from the server with work including one or more compressed video files and work units corresponding to the compressed video files. At step 512, the client process requests the compressed video file from the server.

At step 514, the server process receives the video request from the client and responsively sends a compressed video file to client or a link to a compressed video file if the file is to be retrieved by the client separately.

At step 516, the client process receives the compressed video file from the server. At step 518, the client process requests the first work unit from the server with work units defining areas (e.g., a series of frames, etc.) within the compressed video where work is to be performed for the proof of work.

At step 520, the server process receives the work unit request from client. At step 522, the process retrieves the first work unit to be performed by this client and sends the retrieved work unit back to the client. In one embodiment, the server sends different work units, and possibly different corresponding compressed video files, to different clients with the selection of work units and video files assigned to clients being either random or based on some dispatching algorithm used by the server based on the particular environment in which the process is operating. At step 524, the server process waits for the next request from a client. When the next request is received, the server process loops back to either step 514 (in the case of a video request) or step 520 (in the case of a work unit request) to satisfy the request.

Returning back to client processing, at step 526, the client process receives the work unit from the server. At step 528, the client process plays (renders) the received compressed video file with actual display of the video to a display screen being optional. The client renders the compressed video file by uncompressing the data in the compressed video file to form an image that can be displayed on a display screen with the rendering being based on the type of compression that was used to create the compressed video file. The process determines whether the sequential rendering of the compressed video file has reached the starting frame of the work unit (decision 530). If the sequential rendering of the compressed video file has reached the starting frame of the work unit, then decision 530 branches to the 'yes' branch to perform steps 532 through 542 that process the frames defined by the work unit. On the other hand, if the starting frame of the work unit has not been reached, then decision 530 branches to the 'no' branch which continues to loop back to step 528 to continue playing (rendering) the compressed video file until the starting frame is reached.

Steps 532 through 542 are performed by the client on frames within the defined work unit. At step 532, the process computes a hash of each frame within the segment defined by this work unit (from the starting frame through the ending frame). Each frame within the segment is played (rendered) and a hash is computed for each of the frames. The hash computation results are stored in memory area 534. The process determines as whether the last frame defined by this work unit has been played (rendered) and processed (decision 536). If the last frame defined by this work unit has been played, then decision 536 branches to the 'yes' branch to finalize the client's "answer" of the proof-of-work in steps 538 and 542. On the other hand, if the last frame of the segment defined by the work unit has not been played, then decision 536 branches to 'no' branch which loops back to continue playing frames within the segment defined by the work unit until the last frame of the work unit is reached.

Steps 538 and 540 are performed to finalize the client's answer to the proof of work once the final frame has been rendered and processed. At step 538, the client process combines the computed frame hashes for all of the frames in the segment defined by the work unit stored in memory area 534 with the resulting combination (client's answer) being stored in memory area 540. In one embodiment, the combination of the frame calculations is a hash of all of the computed frame hashes. At step 542, the process submits the combined hash value from memory area 540 to the server.

The client process next determines whether the end of the video file has been reached (decision 544). If the end of the video file has been reached, then decision 544 branches to the 'yes' branch and client processing of this compressed video file ends at 546. In practice, the client may decide to immediately begin the processing again starting at 510 by requesting additional compressed video files and corresponding work units as discussed above. On the other hand, if the end of this video has not been reached, then decision 544 branches to the 'no' branch which loops back to step 518 to request the next work unit, if any, for the compressed video file currently being processed with the next work unit being processed as described above.

Server processing that handles client submissions is shown commencing at 550 with, at step 552, the server receiving a submission from a client. At step 554, the process compares the answer (e.g., the combined hash value, etc.) received from the client with the actual (expected) answer found from the server's previous analysis of the video. In one embodiment, the server's expected answer is derived from processing frames from the actual (raw) video file while in another embodiment, the server's expected answer is from the server's previous processing of frames from this compressed video file or frames from another compressed video file, such as one compressed with a different compression ratio, etc.

Figure 6:
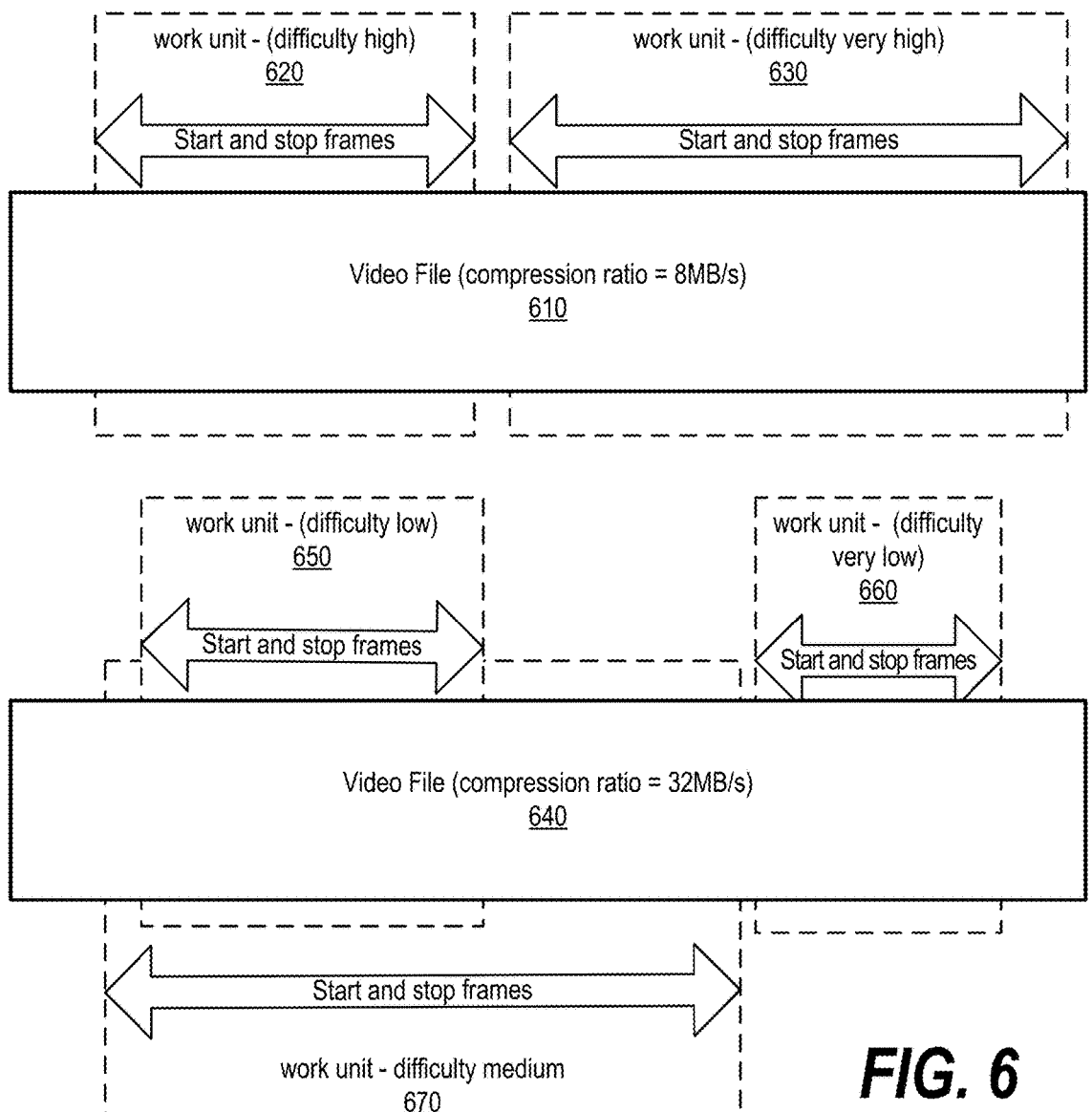
FIG. 6 is a diagram showing an example of work units derived from a single source video file.

The server process determines whether the client's submitted answer is "close enough" or, in other words, within a threshold established by the server (decision 558). The threshold can be a tight tolerance if more difficulty is desired with establishing a proof of work and a more lenient threshold can be used if less difficulty is desired. In addition, as shown in FIG. 6, some work units might be found to be more difficult to compute correctly, based on the images included in the segment of frames defined by the work unit, etc. These more difficult work units may warrant a more lenient tolerance, while easier work units may warrant a more stringent tolerance.

If the client's submitted answer is within the established threshold, then decision 558 branches to the 'yes' branch whereupon, at step 560, this work unit is deemed to be satisfied. On the other hand, if the client's submitted answer is not within the established threshold, then decision 558 branches to the 'no' branch with the client's answer being discarded and the work unit remaining unsatisfied. Other clients will continue working on the work unit until one of the clients submits an answer that is within the established threshold.

When the work unit is satisfied, the server process determines whether all of the work units for this (new) block to the blockchain have been satisfied (decision 562). If all of the work units set forth for this block have been satisfied, then the new block is added to the blockchain (see FIG. 3) and decision 562 branches to the 'yes' branch which loops back to step 502 to set the requirements to add the next block to the blockchain. On the other hand, if all work units for this block have not yet been satisfied, then decision 562 branches to the 'no' branch which loops back to step 552 to receive the next submission from a client and process the submission as discussed above.

FIG. 6 is a diagram showing an example of work units derived from a single source video file. Uncompressed (raw) video file 600 is depicted with compressed video files 610 and 640 being created from video file 600. In the example, video file 610 was created with a compression ratio of 8 MB/s while video file 640 was created with a compression ratio of 32 MB/s. Often, the lower the compression ratio, the more difficult the work units are as more data loss occurs. Two work units are shown corresponding to video file 610—work units 620 and 630. All work units define a segment within the video file from a starting frame to an ending frame. Work unit 620 is shown as being somewhat longer than work unit 630 with the difficulty rating of work unit 620 being noted as "high," while the difficulty rating of work unit 630 is noted as being "very high." Work units 620 and 630 are shown as being non-overlapping so that, in one embodiment, each of these work units could be assigned to the same client.

In the example, three work units are shown corresponding to compressed video file 640—work units 650, 660, and 670. Work unit 650 is shown as being of medium length and its difficulty rating is noted as being "low," while work unit 660 is shown as being somewhat shorter with its difficulty rating being "very low." Finally, work unit 670 is shown being substantially larger (more sequential frames from the starting frame to the ending frame). Its difficulty rating is noted as being "medium." Note that work unit 650 and 670 are overlapping while work unit 660 does not overlap with either work units 650 or 670. In one embodiment, the overlapping of work units 650 and 670 would prevent these units from both being assigned to the same client as that client would be able to work on some parts of both work units simultaneously as there are frames in work unit 650 that are also in work unit 670. However, since work unit 660 does not overlap with either units 650 or 670, a single client could be assigned work unit 670 as well as either work unit 650 or work unit 670 (but not both work units 650 and 670).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor, a memory accessible by the processor, and a network interface connecting the information handling system to a computer network, the method comprising:
    transmitting a compressed video file and a work unit to one or more clients;
    receiving, from at least one of the clients, a proof of work submission resulting from one or more computations performed by the client on a rendered form of the compressed video file;
    determining whether the proof of work submission is acceptable; and
    adding a block to a plurality of blocks in a blockchain in response to the proof of work submission being acceptable.

2. The method of claim 1 further comprising:
    comparing the proof of work submission to an expected answer that was derived from an uncompressed version of the video file, wherein the determination is based on the comparison.

3. The method of claim 2 wherein the expected answer was derived from a plurality of computations performed on a plurality of frames within the uncompressed version of the video file.

4. The method of claim 3 wherein the computations include a hash computation performed on each of the plurality of frames, and wherein the proof of work is generated by combining the hash computations performed on each of the plurality of frames.

5. The method of claim 4 wherein the proof of work is generated by combining the hash computations performed on each of the plurality of frames.

6. The method of claim 1 wherein the proof of work submission is a last of a plurality of proof of work submissions, wherein each of the proof of work submissions is included in a work unit that identifies one or more compressed video files and one or more work segments corresponding to the compressed video files, and wherein each of the work segments identifies a starting frame and an ending frame within the corresponding compressed video file.

7. The method of claim 1 further comprising:
    identifying the work unit to transmit based on a difficulty level associated with the corresponding compressed video file, wherein the difficulty level is adjusted by selecting one or more from the group consisting of:
    changing a number of frames compressed to form the compressed video file; and
    altering an amount of compression loss within the work unit.

8. An information handling system comprising:
    one or more processors;
    a memory coupled to at least one of the processors;
    a network interface that connects the information handling system to a computer network; and
    a set of computer program instructions stored in the memory and executed by at least one of the processors in order to perform actions comprising:
        transmitting a compressed video file and a work unit to one or more clients;
        receiving, from at least one of the clients, a proof of work submission resulting from one or more computations performed by the client on a rendered form of the compressed video file;
        determining whether the proof of work submission is acceptable; and adding a block to a plurality of blocks in a blockchain in response to the proof of work submission being acceptable.

9. The information handling system of claim 8 wherein the actions further comprise:
comparing the proof of work submission to an expected answer that was derived from an uncompressed version of the video file, wherein the determination is based on the comparison.

10. The information handling system of claim 9 wherein the expected answer was derived from a plurality of computations performed on a plurality of frames within the uncompressed version of the video file.

11. The information handling system of claim 10 wherein the computations include a hash computation performed on each of the plurality of frames.

12. The information handling system of claim 11 wherein the proof of work is generated by combining the hash computations performed on each of the plurality of frames.

13. The information handling system of claim 8 wherein the proof of work submission is a last of a plurality of proof of work submissions, wherein each of the proof of work submissions is included in a work unit that identifies one or more compressed video files and one or more work segments corresponding to the compressed video files, and wherein each of the work segments identifies a starting frame and an ending frame within the corresponding compressed video file.

14. The information handling system of claim 8 wherein the actions further comprise:
identifying the work unit to transmit based on a difficulty level associated with the corresponding compressed video file, wherein the difficulty level is adjusted by selecting one or more from the group consisting of:
changing a number of frames compressed to form the compressed video file; and
altering an amount of compression loss within the work unit.

15. A computer program product comprising:
a computer readable storage medium, comprising computer program code that, when executed by an information handling system, executes actions comprising:
transmitting a compressed video file and a work unit to one or more clients;
receiving, from at least one of the clients, a proof of work submission resulting from one or more computations performed by the client on a rendered form of the compressed video file;
determining whether the proof of work submission is acceptable; and
adding a block to a plurality of blocks in a blockchain in response to the proof of work submission being acceptable.

16. The computer program product of claim 15 wherein the actions further comprise:
comparing the proof of work submission to an expected answer that was derived from an uncompressed version of the video file, wherein the determination is based on the comparison.

17. The computer program product of claim 16 wherein the expected answer was derived from a plurality of computations performed on a plurality of frames within the uncompressed version of the video file.

18. The computer program product of claim 17 wherein the computations include a hash computation performed on each of the plurality of frames and wherein the proof of work is generated by combining the hash computations performed on each of the plurality of frames.

19. The computer program product of claim 15 wherein the proof of work submission is a last of a plurality of proof of work submissions, wherein each of the proof of work submissions is included in a work unit that identifies one or more compressed video files and one or more work segments corresponding to the compressed video files, and wherein each of the work segments identifies a starting frame and an ending frame within the corresponding compressed video file.

20. The computer program product of claim 15 wherein the actions further comprise:
comparing the proof of work submission to an expected answer that was derived from a plurality of computations performed on a plurality of frames within the compressed version of the video file.

* * * * *